(12) United States Patent
Nakajima et al.

(10) Patent No.: US 11,494,043 B2
(45) Date of Patent: Nov. 8, 2022

(54) COORDINATE INPUT DEVICE AND COORDINATE CALCULATION METHOD

(71) Applicant: Alps Alpine Co., Ltd., Tokyo (JP)

(72) Inventors: Satoshi Nakajima, Miyagi-ken (JP);
Minoru Watanabe, Miyagi-ken (JP);
Yohei Rokkasho, Miyagi-ken (JP);
Yasuhiro Suzuki, Tokyo (JP)

(73) Assignee: Alps Alpine Co., Ltd.

( * ) Notice: Subject to any disclaimer, the term of this patent is extended or adjusted under 35 U.S.C. 154(b) by 0 days.

(21) Appl. No.: 17/557,455

(22) Filed: Dec. 21, 2021

(65) Prior Publication Data

US 2022/0206640 A1    Jun. 30, 2022

(30) Foreign Application Priority Data

Dec. 25, 2020 (JP) .............................. JP2020-217912

(51) Int. Cl.
*G06F 3/044* (2006.01)
*G06F 3/041* (2006.01)
(52) U.S. Cl.
CPC ........ *G06F 3/0446* (2019.05); *G06F 3/04186* (2019.05); *G06F 2203/04104* (2013.01)
(58) Field of Classification Search
CPC ............... G06F 3/0446; G06F 3/04816; G06F 2203/04104
USPC ........................................................ 345/174
See application file for complete search history.

(56) References Cited

U.S. PATENT DOCUMENTS

| 8,917,257 | B2 | 12/2014 | Hatano | |
|---|---|---|---|---|
| 2010/0097329 | A1* | 4/2010 | Simmons | G06F 3/04166 345/173 |
| 2013/0016045 | A1* | 1/2013 | Zhao | G06F 3/04883 345/173 |
| 2022/0137780 | A1* | 5/2022 | Kim | G06F 3/04186 345/173 |

FOREIGN PATENT DOCUMENTS

JP    2014-186530 A    10/2014

* cited by examiner

*Primary Examiner* — Mark Edwards
(74) *Attorney, Agent, or Firm* — Harness, Dickey & Pierce, P.L.C.

(57) ABSTRACT

A coordinate input device includes a plurality of detection electrodes arranged in a grid shape, a coordinate calculation unit that calculates coordinates representing a proximity position of an object on a basis of changes in capacitances of the plurality of detection electrodes, and an output unit that outputs the coordinates calculated by the coordinate calculation unit. The coordinate calculation unit calculates the coordinates using each of a first calculation method and a second calculation method. In a case where two objects are detected using both the first calculation method and the second calculation method, the output unit outputs the coordinates calculated using the first calculation method in a case where a distance between the two objects is greater than a predetermined first threshold, and outputs the coordinates calculated using the second calculation method in a case where the distance between the two objects is less than a predetermined second threshold.

9 Claims, 10 Drawing Sheets

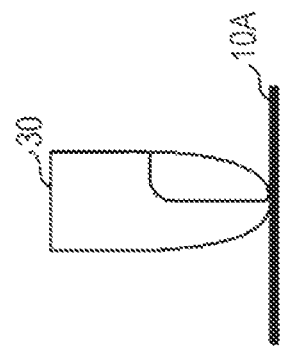
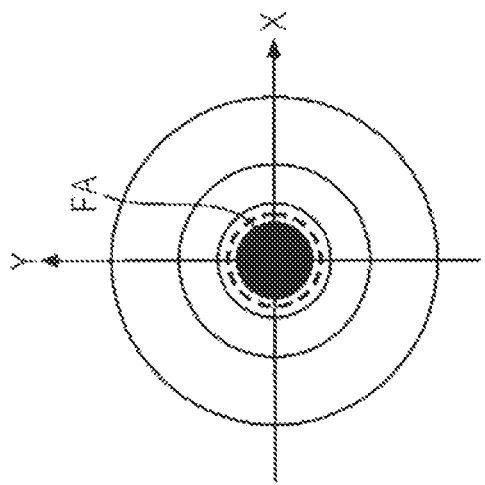
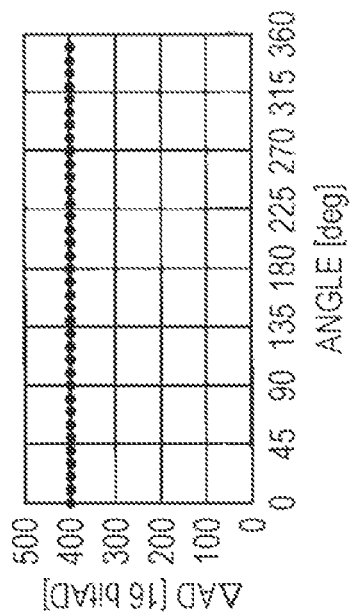

FIG. 7

| NUMBER OF FINGERS DETECTED USING VERTEX CALCULATION METHOD | NUMBER OF FINGERS DETECTED USING CYCLE CALCULATION METHOD | |
| --- | --- | --- |
| | 1 | 2 |
| 1 | OUTPUT COORDINATES OF ONE FINGER DETECTED USING VERTEX CALCULATION METHOD | OUTPUT COORDINATES OF TWO FINGERS DETECTED USING CYCLE CALCULATION METHOD |
| 2 (LESS THAN 21 mm) | OUTPUT COORDINATES OF TWO FINGERS DETECTED USING VERTEX CALCULATION METHOD | OUTPUT COORDINATES OF TWO FINGERS DETECTED USING CYCLE CALCULATION METHOD |
| 2 (GREATER THAN OR EQUAL TO 21 mm) | OUTPUT COORDINATES OF TWO FINGERS DETECTED USING VERTEX CALCULATION METHOD | OUTPUT COORDINATES OF TWO FINGERS DETECTED USING VERTEX CALCULATION METHOD |

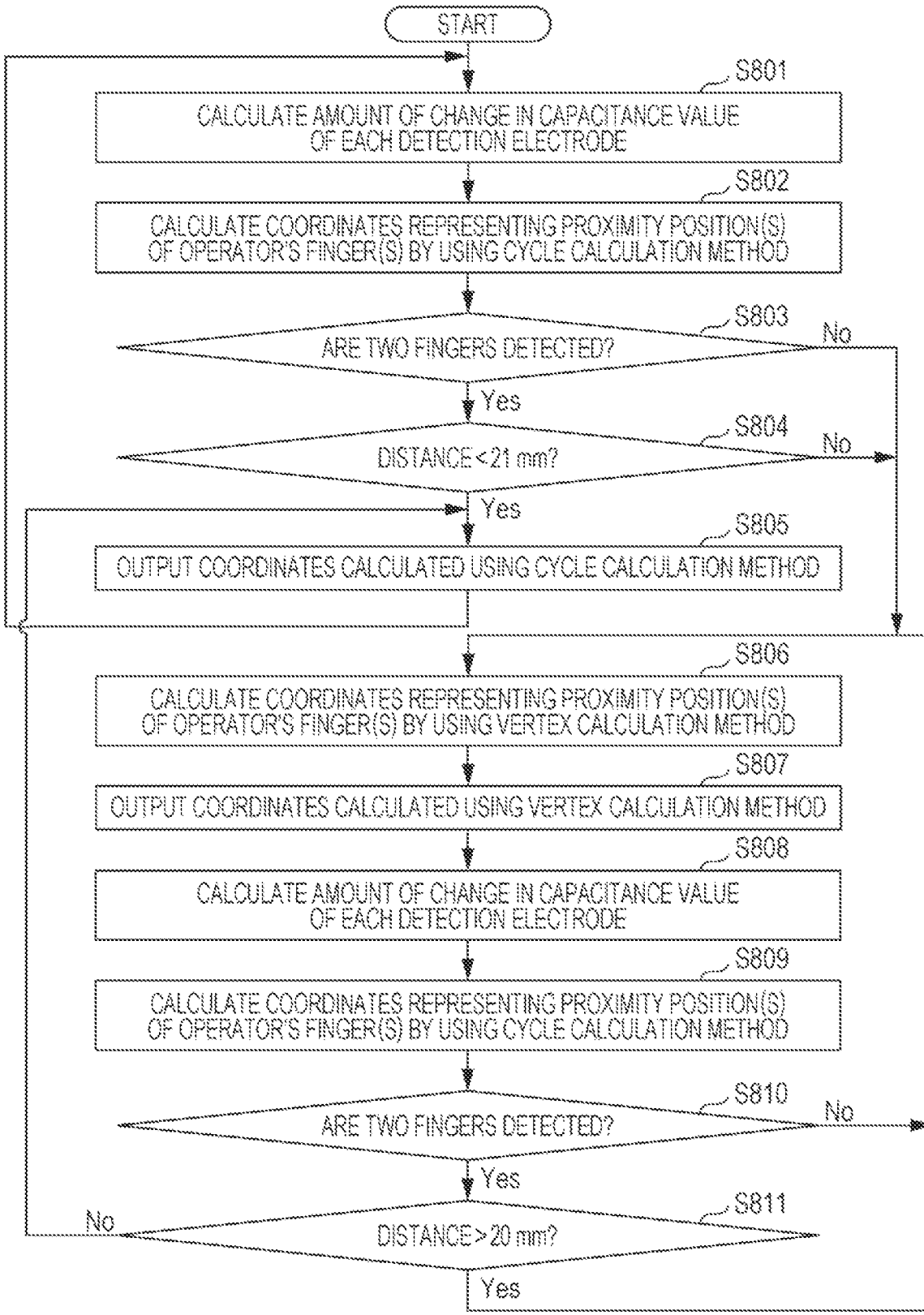

FIG. 9

| NUMBER OF FINGERS DETECTED USING VERTEX CALCULATION METHOD | NUMBER OF FINGERS DETECTED USING CYCLE CALCULATION METHOD | |
|---|---|---|
| | 1 | 2 |
| 1 | OUTPUT COORDINATES OF ONE FINGER DETECTED USING VERTEX CALCULATION METHOD | OUTPUT COORDINATES OF TWO FINGERS DETECTED USING CYCLE CALCULATION METHOD |
| 2 (LESS THAN 20 mm) | OUTPUT COORDINATES OF TWO FINGERS DETECTED USING VERTEX CALCULATION METHOD | OUTPUT COORDINATES OF TWO FINGERS DETECTED USING CYCLE CALCULATION METHOD |
| 2 (20 TO 21 mm) | OUTPUT COORDINATES OF TWO FINGERS DETECTED USING VERTEX CALCULATION METHOD | OUTPUT COORDINATES OF TWO FINGERS DETECTED USING CALCULATION METHOD USED FOR PREVIOUS OUTPUT COORDINATES |
| 2 (GREATER THAN OR EQUAL TO 21 mm) | OUTPUT COORDINATES OF TWO FINGERS DETECTED USING VERTEX CALCULATION METHOD | OUTPUT COORDINATES OF TWO FINGERS DETECTED USING VERTEX CALCULATION METHOD |

COORDINATE INPUT DEVICE AND COORDINATE CALCULATION METHOD

CLAIM OF PRIORITY

This application claims benefit of Japanese Patent Application No. 2020-217912 filed on Dec. 25, 2020, the entirety of which is hereby incorporated by reference.

BACKGROUND OF THE INVENTION

1. Field of the Invention

The present invention relates to a coordinate input device and a coordinate calculation method.

2. Description of the Related Art

In Japanese Unexamined Patent Application Publication No. 2014-186530, for a touch panel configured to detect contact of an object to a contact surface using a capacitive method, there is disclosed a technology for detecting a distribution area or areas where capacitance values exceed a threshold and determining whether a single-touch gesture or a multi-touch gesture has been made on the basis of the shape of the distribution area or areas. In the single-touch gesture, the number of objects that are in contact with the contact surface is one. In the multi-touch gesture, the number of objects that are in contact with the contact surface is two or more.

However, with the existing technology, in a case where a multi-touch gesture is made by two objects, a coordinate position of each of the two objects cannot be calculated with high accuracy in a case where the distance between the two objects is relatively long and a case where the distance between the two objects is relatively short.

SUMMARY OF THE INVENTION

The present invention provides a coordinate input device including a plurality of detection electrodes arranged in a grid shape, a coordinate calculation unit that calculates coordinates representing a proximity position of an object on a basis of a change in a capacitance of each of the plurality of detection electrodes, and an output unit that outputs the coordinates calculated by the coordinate calculation unit. The coordinate calculation unit calculates the coordinates using each of a first calculation method, in which the coordinates are calculated on a basis of a position of a detection electrode where a change in capacitance reaches a peak, and a second calculation method, in which the coordinates are calculated on a basis of periodicity of capacitance values on a circumference of a circle having a predetermined radius around a barycenter of a plurality of detection electrodes for which changes in capacitance are detected. In a case where two objects are detected using both the first calculation method and the second calculation method, the output unit outputs the coordinates calculated using the first calculation method in a case where a distance between the two objects is greater than a predetermined first threshold, and outputs the coordinates calculated using the second calculation method in a case where the distance between the two objects is less than a predetermined second threshold.

According to an embodiment of the present invention, coordinate positions of two respective objects can be calculated with high accuracy in a case where the distance between the two objects is relatively long and a case where the distance between the two objects is relatively short.

BRIEF DESCRIPTION OF THE DRAWINGS

FIGS. 4A to 4C are diagrams illustrating a relationship between an operation input and changes in capacitance in the coordinate input device according to the embodiment;

FIG. 7 is a diagram illustrating an output pattern of the control device (an output unit) according to the embodiment;

FIG. 8 is a flow chart illustrating a modification of the procedure of processing performed by the control device according to the embodiment;

FIG. 9 is a diagram illustrating a modification of the output pattern of the control device (the output unit) according to the embodiment.

DESCRIPTION OF THE PREFERRED EMBODIMENTS

In the following, an embodiment of the present invention will be described with reference to the drawings.

Figure 1:
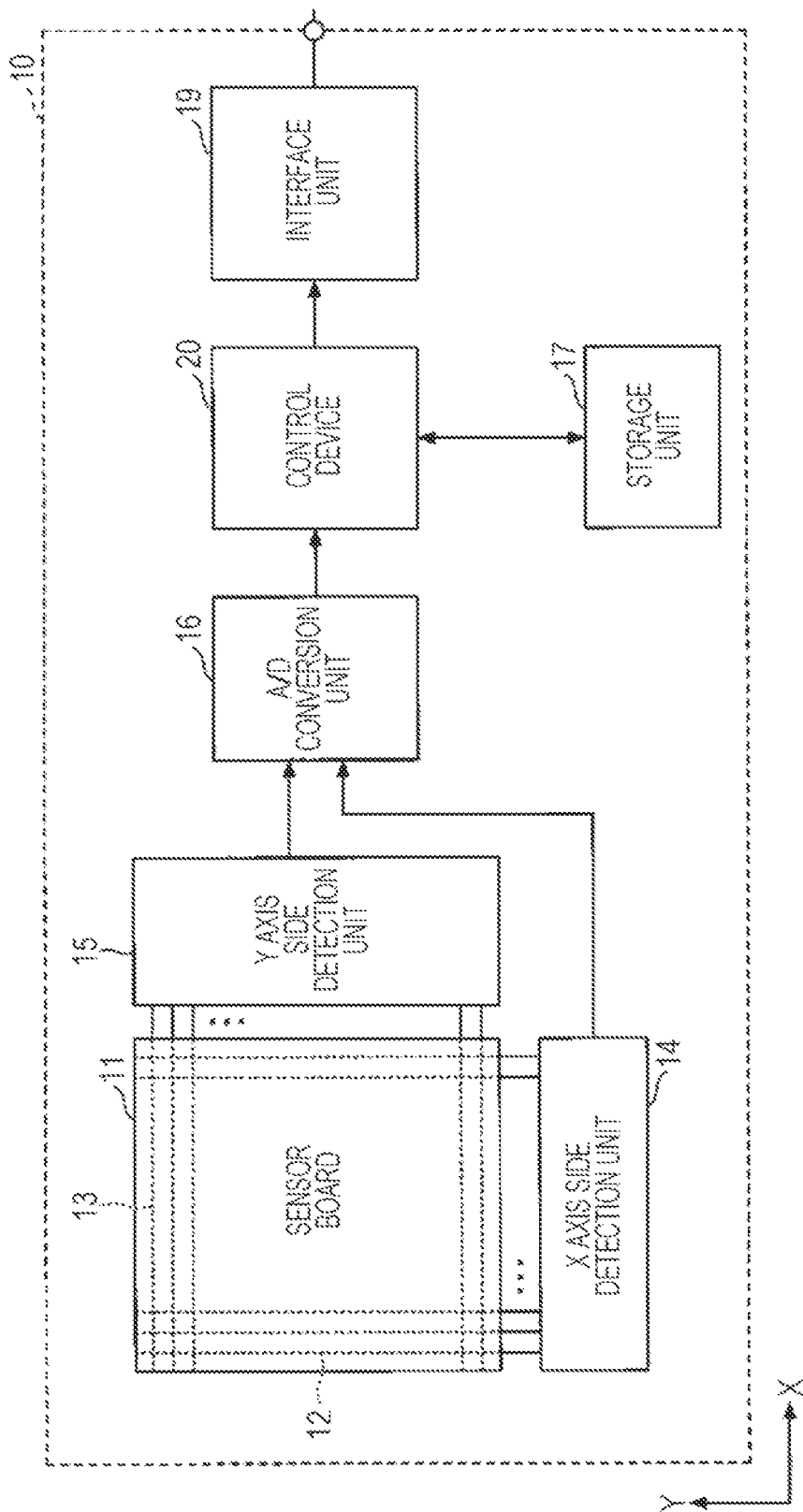
FIG. 1 is a block diagram illustrating the configuration of a coordinate input device according to an embodiment.

FIG. 1 is a block diagram illustrating the configuration of a coordinate input device 10 according to an embodiment. The coordinate input device 10 illustrated in FIG. 1 is a device that allows a finger 30 (an example of an "object") of an operator to perform a proximity operation on an operation surface 10A (see FIG. 3). The coordinate input device 10 is a device that can detect a proximity position of a finger 30 of the operator with respect to the operation surface 10A using a capacitive method (a self-capacitance detection method or a mutual capacitance detection method).

As illustrated in FIG. 1, the coordinate input device 10 includes a sensor board 11, an X axis side detection unit 14, a Y axis side detection unit 15, an analog-to-digital (A/D) conversion unit 16, a storage unit 17, a control device 20, and an interface unit 19.

The sensor board 11 is provided so as to overlap the back side of the operation surface 10A. The sensor board 11 is provided with a plurality of X axis electrodes 12 and a plurality of Y axis electrodes 13 arranged in a matrix shape. The plurality of X axis electrodes 12 are provided so as to align in the X axis direction in order to detect capacitances in the X axis direction (a horizontal direction in FIG. 1). The plurality of Y axis electrodes 13 are provided so as to align in the Y axis direction in order to detect capacitances in the Y axis direction (a vertical direction in FIG. 1).

The X axis side detection unit 14 is configured to detect the capacitance of each of the plurality of X axis electrodes 12. The X axis side detection unit 14 outputs a detection signal (an analog signal) representing the detected capacitance of each of the plurality of X axis electrodes 12.

The Y axis side detection unit 15 is configured to detect the capacitance of each of the plurality of Y axis electrodes 13. The Y axis side detection unit 15 outputs a detection signal (an analog signal) representing the detected capacitance of each of the plurality of Y axis electrodes 13.

The A/D conversion unit 16 converts the detection signal output from the X axis side detection unit 14 and the detection signal output from the Y axis side detection unit 15 into a digital signal and supplies the digital signal to the control device 20.

The storage unit 17 stores various types of information. Examples of information stored in the storage unit 17 include the capacitance value of each of the plurality of X axis electrodes 12 detected by the X axis side detection unit 14, the capacitance value of each of the plurality of Y axis electrodes 13 detected by the Y axis side detection unit 15, and a program executed by the control device 20.

The control device 20 is configured to detect a proximity position of the finger 30 of the operator in the X axis direction on the operation surface 10A on the basis of a change in the capacitance of each of the plurality of X axis electrodes 12 specified by the detection signal supplied from the X axis side detection unit 14 via the A/D conversion unit 16. Moreover, the control device 20 is configured to detect a proximity position of the finger 30 of the operator in the Y axis direction on the operation surface 10A on the basis of a change in the capacitance of each of the plurality of Y axis electrodes 13 specified by the detection signal supplied from the Y axis side detection unit 15 via the A/D conversion unit 16. The control device 20 then outputs coordinate information representing the specified proximity position (an X axis coordinate and a Y axis coordinate) of the finger 30 of the operator. Note that details of the functions of the control device 20 will be described later using FIG. 2.

The interface unit 19 outputs, to an external device (omitted in the drawings), coordinate information representing the proximity position of the finger 30 of the operator output from the control device 20. For example, in accordance with the coordinate information output from the interface unit 19 and representing the proximity position of the finger 30, the external device executes predetermined processing corresponding to the coordinates.

Figure 2:
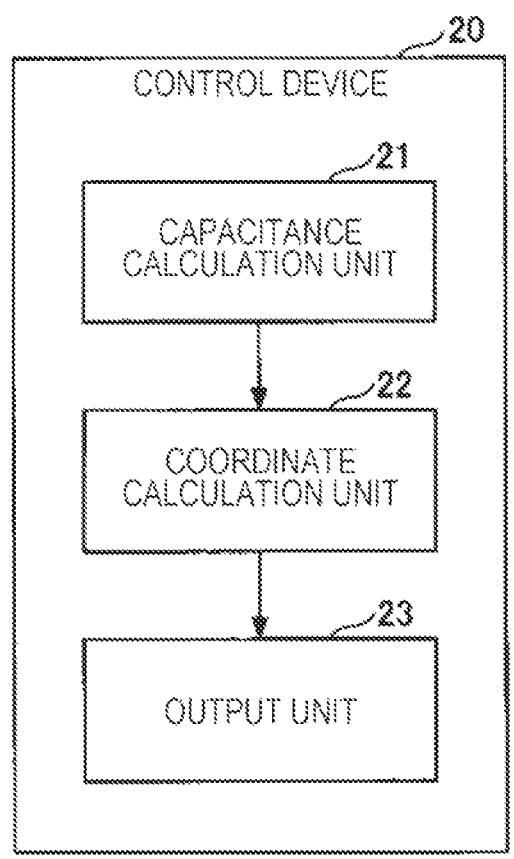
FIG. 2 is a block diagram illustrating a functional configuration of a control device according to the embodiment.

Functional Configuration of Control Device 20 FIG. 2 is a block diagram illustrating a functional configuration of the control device 20 according to the embodiment. As illustrated in FIG. 2, the control device 20 includes a capacitance calculation unit 21, a coordinate calculation unit 22, and an output unit 23.

The capacitance calculation unit 21 calculates, for each detection electrode, the amount of change in the capacitance of the detection electrode on the basis of the detection signals supplied from the X axis side detection unit 14 and the Y axis side detection unit 15 via the A/D conversion unit 16.

The coordinate calculation unit 22 calculates, for each of the X axis direction and the Y axis direction, a coordinate representing the proximity position of the finger 30 of the operator on the operation surface 10A on the basis of the amount of change in the capacitance of each detection electrode detected by the capacitance calculation unit 21.

In the present embodiment, the coordinate calculation unit 22 can calculate, for each of the X axis direction and the Y axis direction, a coordinate representing the proximity position of the finger 30 of the operator by using each of a vertex calculation method and a cycle calculation method. The "vertex calculation method" is an example of a "first calculation method". The "vertex calculation method" is a method for calculating a coordinate on the basis of the position of a detection electrode where the change in capacitance reaches a peak. The "cycle calculation method" is an example of a "second calculation method". The "cycle calculation method" is a method for calculating coordinates on the basis of the periodicity of capacitance values on the circumference of a circle having a predetermined radius from the barycenter of a plurality of detection electrodes for which changes in capacitance are detected.

In the present embodiment, in a case where two fingers 30 of the operator have performed a proximity operation on the operation surface 10A, the coordinate calculation unit 22 of the control device 20 can also calculate, for each of the X axis direction and the Y axis direction, coordinates representing proximity positions of the two respective fingers 30 of the operator by using each of the vertex calculation method and the cycle calculation method.

The output unit 23 outputs coordinates detected by the coordinate calculation unit 22 (that is, coordinates representing a proximity position of a finger 30 of the operator). In the present embodiment, in a case where two fingers 30 of the operator are detected by the coordinate calculation unit 22 using both the vertex calculation method and the cycle calculation method, the output unit 23 outputs the coordinates calculated using the first calculation method in a case where the distance between the two fingers 30 is greater than a predetermined first threshold and outputs the coordinates calculated using the second calculation method in a case where the distance between the two fingers 30 is less than a predetermined second threshold. In the present embodiment, "22 mm" is used as both of the first threshold and the second threshold.

Note that the control device 20 includes a processor (for example, a central processing unit (CPU)), a storage medium (for example, a read-only memory (ROM), a random access memory (RAM), a solid state drive (SSD), or the like), and a communication interface as a hardware configuration. For example, individual functional units of the control device 20 illustrated in FIG. 2 are realized by the processor executing a program stored in the storage medium. At least any one out of the A/D conversion unit 16, the storage unit 17, and the interface unit 19 may be provided in the control device 20.

Example of Coordinates calculated using Vertex Calculation Method

Figure 3:
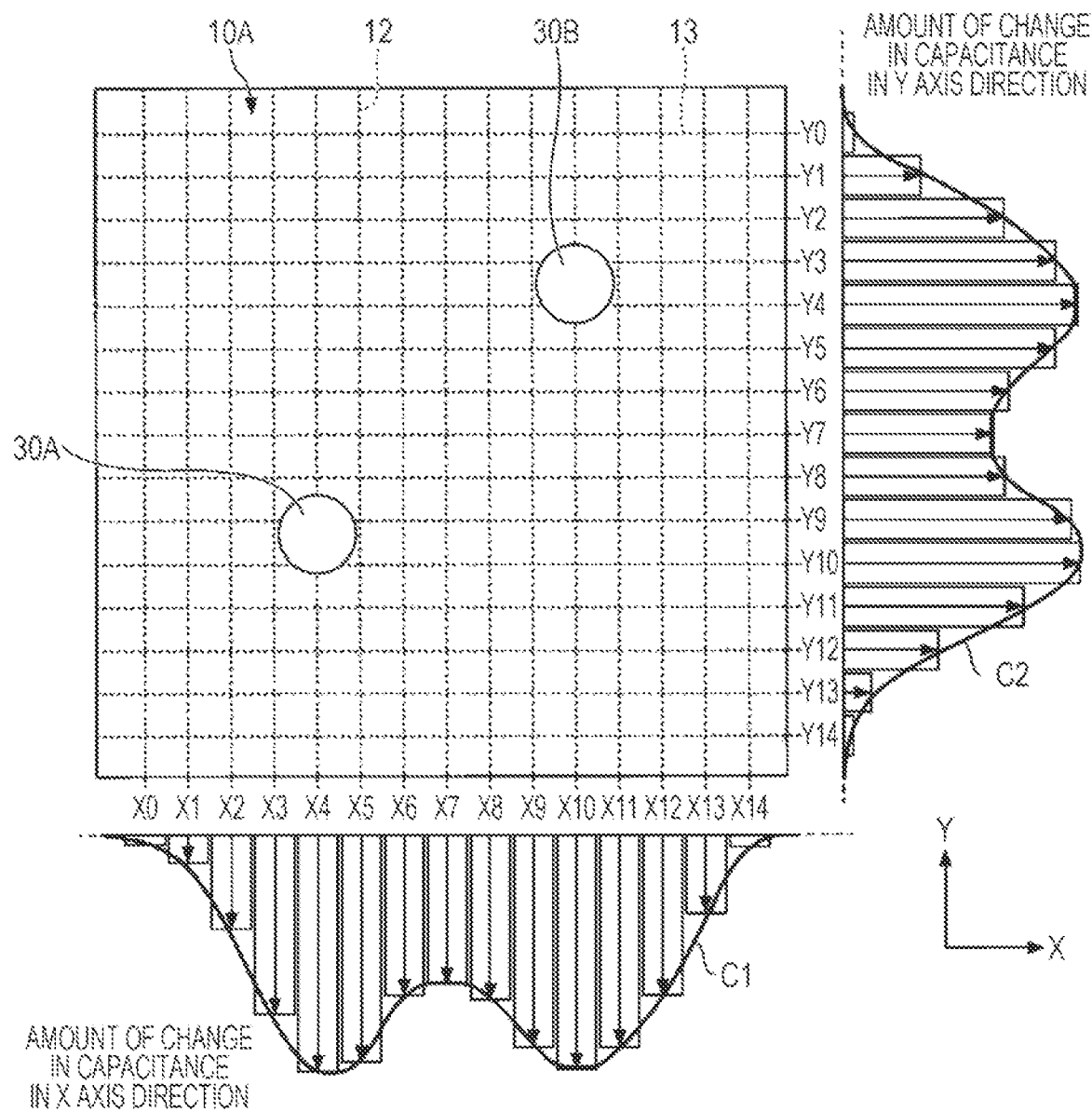
FIG. 3 is a diagram illustrating an example of coordinates calculated by the control device (a coordinate calculation unit) according to the embodiment.

FIG. 3 is a diagram illustrating an example of coordinates calculated by the control device 20 (the coordinate calculation unit 22) according to the embodiment.

In the example illustrated in FIG. 3, the sensor board 11 is provided with 15 X axis electrodes 12 (X0 to X14) and 15 Y axis electrodes 13 (Y0 to Y14). The X axis electrodes 12 and the Y axis electrodes 13 are arranged in a matrix shape so as to overlap the operation surface 10A. In the example illustrated in FIG. 3, two fingers 30A and 30B of the operator perform a proximity operation on the operation surface 10A.

As illustrated in FIG. 3, in the X axis direction, peaks of the amount of change in capacitance occur at the X axis electrode X4, which overlaps the finger 30A, and the X axis electrode X10, which overlaps the finger 30B.

Moreover, as illustrated in FIG. 3, in the Y axis direction, peaks of the amount of change in capacitance occur at the Y axis electrode Y10, which overlaps the finger 30A, and the Y axis electrode Y4, which overlaps the finger 30B.

For example, the coordinate calculation unit 22 can calculate, using the vertex calculation method, an X axis coordinate of a vertex position of a quadratic curve C1 as an X axis coordinate representing a proximity position of the finger 30A. The quadratic curve C1 passes through the X axis electrode X4 and the X axis electrodes X3 and X5 immediately before and after the X axis electrode X4.

Similarly, the coordinate calculation unit 22 can calculate, using the vertex calculation method, an X axis coordinate of a vertex position of the quadratic curve C1 as an X axis coordinate representing a proximity position of the finger 30B. The quadratic curve C1 passes through the X axis electrode X10 and the X axis electrodes X9 and X11 immediately before and after the X axis electrode X10.

Similarly, the coordinate calculation unit 22 can calculate, using the vertex calculation method, a Y axis coordinate of a vertex position of a quadratic curve C2 as a Y axis coordinate representing the proximity position of the finger 30A. The quadratic curve C2 passes through the Y axis electrode Y10 and the Y axis electrodes Y9 and Y11 immediately before and after the Y axis electrode Y10.

Similarly, the coordinate calculation unit 22 can calculate, using the vertex calculation method, a Y axis coordinate of a vertex position of the quadratic curve C2 as a Y axis coordinate representing the proximity position of the finger 30B. The quadratic curve C2 passes through the Y axis electrode Y4 and the Y axis electrodes Y3 and Y5 immediately before and after the Y axis electrode Y4.

For example, for each of the X axis direction and the Y axis direction, the coordinate calculation unit 22 treats an electrode having the largest amount of change in capacitance as a peak electrode and can calculate, from Equation (1) below, a vertex of a quadratic curve passing through an amount of change $X_{pk}$, an amount of change $X_{pk-1}$, and an amount of change $X_{pk+1}$ as a coordinate XQ representing a proximity position of a finger 30 of the operator. The amount of change $X_{pk}$ is the amount of change in capacitance at the peak electrode. The amount of change $X_{pk-1}$ is the amount of change in capacitance at an electrode that is immediately before the peak electrode. The amount of change $X_{pk+1}$ is the amount of change in capacitance at an electrode that is immediately after the peak electrode.

$$XQ = \frac{X_{pk-1} - X_{pk+1}}{2(X_{pk-1} + X_{pk+1} + 2X_{pk})} \times RESO + X_{OFS} \quad (1)$$

Note that, in Equation (1) above, RESO denotes an interelectrode resolution, and $X_{OFS}$ denotes a coordinate of the peak electrode.

Example of Coordinates calculated using Cycle Calculation Method

In the following, an example of coordinates calculated by the coordinate calculation unit 22 using the cycle calculation method will be described with reference to FIGS. 4A to 5C.

First, the coordinate calculation unit 22 calculates barycentric coordinates on the basis of changes in the capacitances of a plurality of detection electrodes calculated by the capacitance calculation unit 21.

Next, the coordinate calculation unit 22 calculates a change in capacitance at an intersection point of each detection electrode on the circumference of a measurement circle. The measurement circle is centered around the calculated barycentric coordinates and has a predetermined radius.

The coordinate calculation unit 22 then determines whether the calculated changes in capacitance at the intersection points of the detection electrodes exhibit 2-cycle periodicity along the circumference of the measurement circle.

In a case where the coordinate calculation unit 22 determines that "2-cycle periodicity is not exhibited", the coordinate calculation unit 22 determines that "an input operation is performed by one finger 30 of the operator" and outputs the barycentric coordinates above as coordinates representing a proximity position of the one finger 30 of the operator.

In contrast, in a case where the coordinate calculation unit 22 determines that "2-cycle periodicity is exhibited", the coordinate calculation unit 22 determines that "an input operation is performed by two fingers 30 of the operator" and calculates and outputs coordinates representing a proximity position of each of the two fingers 30 of the operator.

Figure 5A:
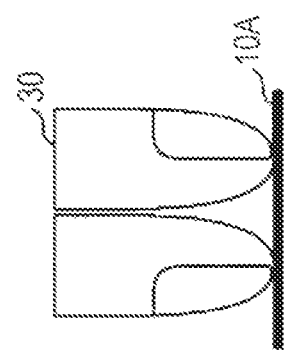
FIGS. 5A to 5C are diagrams illustrating a relationship between an operation input and changes in capacitance in the coordinate input device according to the embodiment.
Figure 5B:
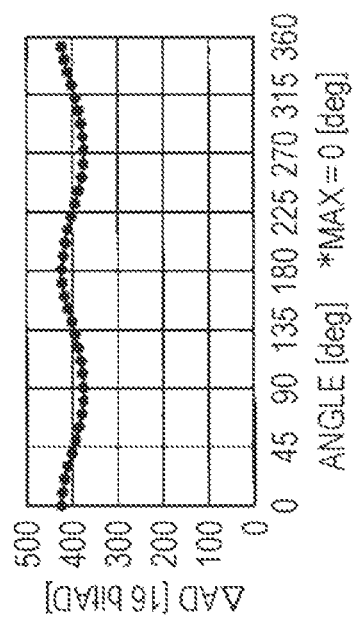
Figure 5C:
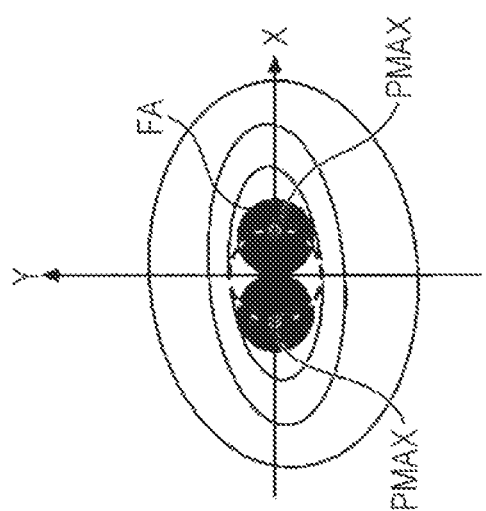

FIGS. 4A to 5C are diagrams illustrating relationships between operation inputs and changes in capacitance in the coordinate input device 10 according to the embodiment. FIGS. 4A to 4C illustrate a case where an operation input is performed on the operation surface 10A by one finger 30 of the operator as illustrated in FIG. 4A. FIGS. 5A to 5C illustrate a case where an operation input is performed on the operation surface 10A by two fingers 30 of the operator as illustrated in FIG. 5A.

FIGS. 4B and 5B illustrate planar distributions of the amount of change in capacitance on the operation surface 10A. In FIGS. 4B and 5B, the planar distributions of the amount of change in capacitance are illustrated using contour lines of the amounts of change in capacitance (solid closed curves). In FIGS. 4B and 5B, measurement circles having a predetermined radius r are illustrated by a dashed line. Moreover, in FIGS. 4B and 5B, finger areas FA are illustrated as filled-in circles. Each finger area FA is an area with which a finger 30 of the operator is in contact. Note that, in the present embodiment, the radius r is set to "9 mm" so as to match a typical finger 30 size, but the radius r is not limited thereto.

FIGS. 4C and 5C illustrate angle characteristics of difference values. In FIGS. 4C and 5C, the horizontal axis represents position on the measurement circle (angle with respect to a barycenter), and the vertical axis represents the amount of change in capacitance on the measurement circle.

For example, in a case where an operation input is performed by one finger 30 of the operator as illustrated in FIG. 4A, a finger area FA, where the amount of change in capacitance is greater than or equal to a predetermined threshold, has a circle shape, and contour lines also have circle shapes as illustrated in FIG. 4B. The barycenter serving as the center of the measurement circle serves as the barycenter of the finger area FA. In this case, the amounts of change in capacitance at sampling points on the measurement circle are equal to each other. Thus, the angle characteristics of the amounts of change in capacitance exhibit a flat characteristic as illustrated in FIG. 4C. In this case, the coordinate calculation unit 22 determines that "an input operation is performed by one finger 30 of the operator" and outputs the barycentric coordinates above as coordinates representing a proximity position of the one finger 30 of the operator.

In a case where an operation input is performed by two fingers 30 of the operator as illustrated in FIG. 5A, two finger areas FA, where the amount of change in capacitance is greater than or equal to the predetermined threshold, have circle shapes, and contour lines have oval shapes as illustrated in FIG. 5B. The widths of these oval shapes are wider in a direction in which two fingers 30 of the operator are aligned (X direction) than in a direction orthogonal to the direction (Y direction). Moreover, the barycenter serving as the center of the measurement circle is positioned at the midpoint of a straight line connecting the barycenters of the two finger areas FA to each other. In this case, the measurement circle has two points PMAX, where the amount of change in capacitance becomes maximum. Thus, the angle characteristics of the amounts of change in capacitance exhibit 2-cycle periodicity along the circumference of the measurement circle as illustrated in FIG. 5C. In this case, the coordinate calculation unit 22 determines that "an input operation is performed by two fingers 30 of the operator" and calculates and outputs coordinates representing a proximity position of each of the two fingers 30 of the operator.

For example, the coordinate calculation unit 22 calculates, using the cycle calculation method, periodicity of the amounts of change in capacitance in the measurement circle (the predetermined radius r) through Fourier series expansion. The coordinate calculation unit 22 can calculate coordinates of each of the two fingers 30 on the basis of the distance from the barycenter of each of the two fingers 30 calculated using a coefficient of the periodicity and the direction from the barycenter of each of the two fingers 30 calculated using the phase of the periodicity (the angle formed by a straight line connecting the two fingers 30 with respect to the X axis).

Procedure of Processing performed by Control Device 20

Figure 6:
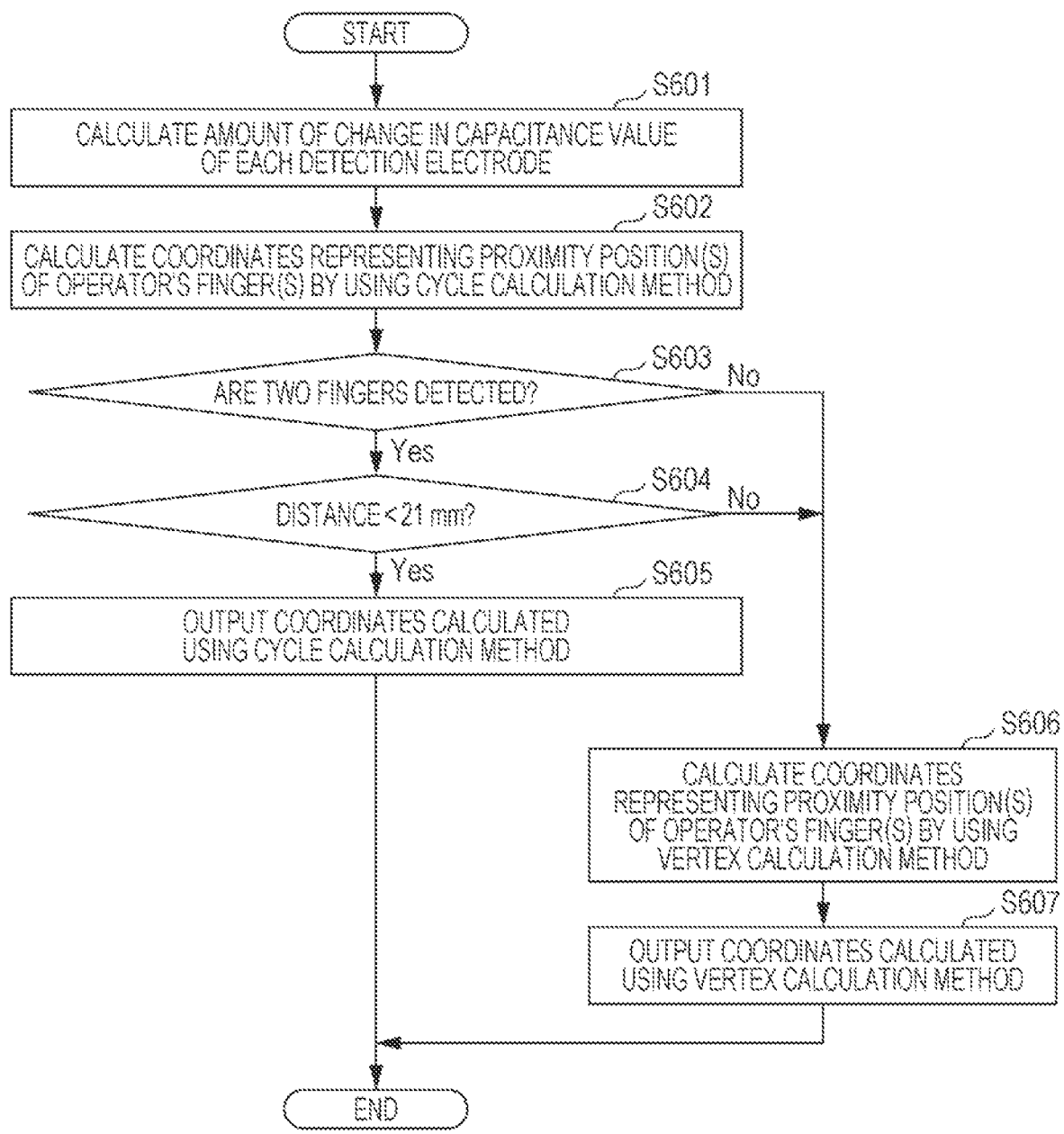
FIG. 6 is a flow chart illustrating the procedure of processing performed by the control device according to the embodiment.

FIG. 6 is a flow chart illustrating the procedure of processing performed by the control device 20 according to the embodiment.

First, the capacitance calculation unit 21 calculates, for each detection electrode, the amount of change in the capacitance of the detection electrode on the basis of the detection signals supplied from the X axis side detection unit 14 and the Y axis side detection unit 15 via the A/D conversion unit 16 (step S601).

Next, the coordinate calculation unit 22 calculates coordinates representing a proximity position of a finger 30 of the operator or proximity positions of fingers 30 of the operator by using the cycle calculation method on the basis of the amounts of change in the capacitances of the detection electrodes calculated in step S601 (step S602).

Next, the output unit 23 determines whether their two fingers 30 are detected using the cycle calculation method in step S602 (step S603).

In step S603, in a case where it is determined that their two fingers 30 are not detected using the cycle calculation method (step S603: No), the coordinate calculation unit 22 calculates coordinates representing a proximity position of the finger 30 of the operator by using the vertex calculation method on the basis of the amounts of change in the capacitances of the detection electrodes calculated in step S601 (step S606). The output unit 23 then outputs the coordinates calculated using the vertex calculation method in step S606 (step S607). Thereafter, the control device 20 ends the series of processes illustrated in FIG. 6.

In contrast, in step S603, in a case where it is determined that their two fingers 30 are detected using the cycle calculation method (step S603: Yes), the output unit 23 determines whether the distance between two sets of coordinates calculated using the cycle calculation method in step S602 is less than "21 mm" (step S604).

In step S604, in a case where it is determined that the distance between the two sets of coordinates is not less than "21 mm" (step S604: No), the coordinate calculation unit 22 calculates coordinates representing a proximity position of the finger 30 of the operator or proximity positions of the fingers 30 of the operator by using the vertex calculation method on the basis of the amounts of change in the capacitances of the detection electrodes calculated in step S601 (step S606). The output unit 23 then outputs the coordinates calculated using the vertex calculation method in step S606 (step S607). Thereafter, the control device 20 ends the series of processes illustrated in FIG. 6.

In contrast, in step S604, in a case where it is determined that the distance between the two sets of coordinates is less than "21 mm" (step S604: Yes), the output unit 23 outputs the coordinates calculated using the cycle calculation method in step S602 (step S605). Thereafter, the control device 20 ends the series of processes illustrated in FIG. 6.

Output Pattern of Output Unit 23

FIG. 7 is a diagram illustrating an output pattern of the control device 20 (the output unit 23) according to the embodiment. FIG. 7 illustrates an output pattern of coordinates based on the series of processes illustrated in FIG. 6.

As illustrated in FIG. 7, in a case where one finger 30 of the operator is detected using the cycle calculation method, the output unit 23 outputs coordinates of one or two fingers 30 of the operator calculated using the vertex calculation method.

As illustrated in FIG. 7, in a case where two fingers 30 of the operator are detected using the cycle calculation method and where the distance between two sets of coordinates calculated using the cycle calculation method is greater than or equal to "21 mm", the output unit 23 outputs two sets of coordinates calculated using the vertex calculation method.

In contrast, as illustrated in FIG. 7, in a case where two fingers 30 of the operator are detected using the cycle calculation method and where the distance between two sets of coordinates calculated using the cycle calculation method is less than "21 mm", the output unit 23 outputs the two sets of coordinates calculated using the cycle calculation method.

Moreover, as illustrated in FIG. 7, in a case where two fingers 30 of the operator are detected using the cycle calculation method and where one finger 30 of the operator is detected using the vertex calculation method, the output unit 23 outputs two sets of coordinates calculated using the cycle calculation method.

As described above, the coordinate input device 10 according to the embodiment includes the plurality of detection electrodes, which are arranged in a grid shape, the coordinate calculation unit 22, which calculates coordinates representing the proximity position of the finger 30 of the operator on the basis of changes in the capacitances of the plurality of detection electrodes, and the output unit 23, which outputs the coordinates calculated by the coordinate calculation unit 22. The coordinate calculation unit 22 calculates the coordinates using each of the vertex calculation method and the cycle calculation method. In the vertex calculation method, the coordinates are calculated on the basis of the position of a detection electrode where the change in capacitance reaches a peak. In the cycle calculation method, the coordinates are calculated on the basis of periodicity of capacitance values on the circumference of a circle having a predetermined radius around a barycenter of a plurality of detection electrodes for which changes in capacitance are detected. In a case where the two fingers 30 are detected using both the vertex calculation method and the cycle calculation method, the output unit 23 outputs the coordinates calculated using the vertex calculation method in a case where the distance between the two fingers 30 is greater than the predetermined first threshold, and outputs the coordinates calculated using the cycle calculation method in a case where the distance between the two fingers 30 is less than the predetermined second threshold.

As a result, in a case where the distance between the two fingers 30 is relatively long, the coordinate input device 10 according to the embodiment can output highly accurate coordinates by outputting the coordinates calculated using the vertex calculation method. In a case where the distance between the two fingers 30 is relatively short, the coordinate input device 10 according to the embodiment can output highly accurate coordinates by outputting the coordinates calculated using the cycle calculation method. Thus, with the coordinate input device 10 according to the embodiment, the coordinate positions of two respective objects can be calculated with high accuracy in each of the case where the distance between the two objects is relatively long and the case where the distance between the two objects is relatively short.

In the coordinate input device 10 according to the embodiment, in a case where the two fingers 30 are detected using both the vertex calculation method and the cycle calculation method, the output unit 23 may output the coordinates calculated using the vertex calculation method in a case where the distance between the two fingers 30 detected using the cycle calculation method is greater than the predetermined first threshold, and may output the coordinates calculated using the cycle calculation method in a case where the distance between the two fingers 30 detected using the cycle calculation method is less than the predetermined second threshold.

As a result, especially in a case where the distance between the two fingers 30 is less than the second threshold, the coordinate input device 10 according to the embodiment can calculate the coordinates of the two fingers 30 with higher accuracy using the cycle calculation method than using the vertex calculation method. The coordinate input device 10 according to the embodiment can thus determine to-be-output coordinates on the basis of the distance based on the highly accurate coordinates calculated using the cycle calculation method.

In the coordinate input device 10 according to the embodiment, the coordinate calculation unit 22 may calculate, using the cycle calculation method, periodicity of the amounts of change in capacitance in the measurement circle (the predetermined radius r) through Fourier series expansion, and may calculate coordinates of each of the two fingers 30 on the basis of the distance from the barycenter of each of the two fingers 30 calculated using a coefficient of the periodicity and the direction from the barycenter of each of the two fingers 30 calculated using the phase of the periodicity.

As a result, the coordinate input device 10 according to the embodiment can calculate, with high accuracy, coordinates of each of the two fingers 30 even in a case where the distance between the two fingers 30 is relatively short.

In the coordinate input device 10 according to the embodiment, in a case where the two fingers 30 are not detected using the cycle calculation method (that is, a case where one finger 30 of the operator is detected using the cycle calculation method), the output unit 23 may output coordinates calculated using the vertex calculation method.

As a result, in a case where a proximity operation is performed by one finger 30 of the operator, the coordinate input device 10 according to the embodiment can calculate coordinates representing the proximity position of the one finger 30 with high accuracy using the vertex calculation method.

Moreover, in the coordinate input device 10 according to the embodiment, the coordinate calculation unit 22 may calculate, as coordinates representing the proximity position of a finger 30 of the operator, a vertex of a quadratic curve passing through the amount of change in capacitance at a peak electrode having the largest amount of change in capacitance, the amount of change in capacitance at a detection electrode that is immediately before the peak electrode, and the amount of change in capacitance at a detection electrode that is immediately after the peak electrode by using the vertex calculation method.

As a result, the coordinate input device 10 according to the embodiment can calculate coordinates representing the proximity position of the finger 30 of the operator with a higher resolution than the spacing between the detection electrodes.

Modification of Procedure of Processing performed by Control Device 20

FIG. 8 is a flow chart illustrating a modification of the procedure of processing performed by the control device 20 according to the embodiment.

First, the capacitance calculation unit 21 calculates, for each detection electrode, the amount of change in the capacitance of the detection electrode on the basis of the detection signals supplied from the X axis side detection unit 14 and the Y axis side detection unit 15 via the A/D conversion unit 16 (step S801).

Next, the coordinate calculation unit 22 calculates coordinates representing a proximity position of a finger 30 of the operator or proximity positions of fingers 30 of the operator by using the cycle calculation method on the basis of the amounts of change in the capacitances of the detection electrodes calculated in step S801 (step S802).

Next, the output unit 23 determines whether their two fingers 30 are detected using the cycle calculation method in step S802 (step S803).

In step S803, in a case where it is determined that their two fingers 30 are detected using the cycle calculation method (step S803: Yes), the output unit 23 determines whether the distance between two sets of coordinates calculated using the cycle calculation method in step S802 is less than "21 mm" (a first threshold) (step S804).

In step S804, in a case where it is determined that the distance between the two sets of coordinates is less than "21 mm" (step S804: Yes), the output unit 23 outputs the coordinates calculated using the cycle calculation method in step S802 (step S805). Thereafter, the control device 20 causes the procedure to return to step S801.

In contrast, in a case where it is determined in step S803 that their two fingers 30 are not detected using the cycle calculation method (step S803: No) and a case where it is determined in step S804 that the distance between the two sets of coordinates is not less than "21 mm" (step S804: No), the control device 20 causes the procedure to proceed to step S806.

In step S806, the coordinate calculation unit 22 calculates coordinates representing the proximity position of the finger 30 of the operator or the proximity positions of the fingers 30 of the operator by using a vertex calculation method on the basis of the amounts of change in the capacitances of the detection electrodes calculated in step S801 (step S806). The output unit 23 then outputs the coordinates calculated using the vertex calculation method in step S606 (step S807).

Subsequently, the capacitance calculation unit 21 calculates, for each detection electrode, the amount of change in the capacitance of the detection electrode on the basis of the detection signals supplied from the X axis side detection unit 14 and the Y axis side detection unit 15 via the A/D conversion unit 16 (step S808).

Next, the coordinate calculation unit 22 calculates coordinates representing the proximity position of the finger 30 of the operator or the proximity positions of the fingers 30 of the operator by using the cycle calculation method on the basis of the amounts of change in the capacitances of the detection electrodes calculated in step S808 (step S809).

Next, the output unit 23 determines whether their two fingers 30 are detected using the cycle calculation method in step S809 (step S810).

In step S810, in a case where it is determined that their two fingers 30 are not detected using the cycle calculation method (step S810: No), the control device 20 causes the procedure to return to step S806.

In contrast, in step S810, in a case where it is determined that their two fingers 30 are detected using the cycle calculation method (step S810: Yes), the output unit 23 determines whether the distance between two sets of coordinates calculated using the cycle calculation method in step S809 is greater than "20 mm" (a second threshold) (step S811).

In step S811, in a case where it is determined that the distance between the two sets of coordinates is greater than "20 mm" (step S811: Yes), the control device 20 causes the procedure to return to step S806.

In contrast, in step S811, in a case where it is determined that the distance between the two sets of coordinates is not greater than "20 mm" (step S811: No), the control device 20 causes the procedure to return to step S805.

Modification of Output Pattern of Output Unit 23 FIG. 9 is a diagram illustrating a modification of the output pattern of the control device 20 (the output unit 23) according to the embodiment. FIG. 9 illustrates an output pattern of coordinates based on the series of processes illustrated in FIG. 8.

As illustrated in FIG. 9, in a case where one finger 30 of the operator is detected using the cycle calculation method, the output unit 23 outputs coordinates of one or two fingers 30 of the operator calculated using the vertex calculation method.

As illustrated in FIG. 9, in a case where two fingers 30 of the operator are detected using the cycle calculation method and where the distance between two sets of coordinates calculated using the cycle calculation method is greater than or equal to "21 mm" (the first threshold), the output unit 23 outputs two sets of coordinates calculated using the vertex calculation method.

In contrast, as illustrated in FIG. 9, in a case where two fingers 30 of the operator are detected using the cycle calculation method and where the distance between the two sets of coordinates calculated using the cycle calculation method is less than "20 mm" (the second threshold), the output unit 23 outputs the two sets of coordinates calculated using the cycle calculation method.

Moreover, as illustrated in FIG. 9, in a case where two fingers 30 of the operator are detected using the cycle calculation method and where one finger 30 of the operator is detected using the vertex calculation method, the output unit 23 outputs two sets of coordinates calculated using the cycle calculation method.

As illustrated in FIG. 9, in a case where two fingers 30 of the operator are detected using the cycle calculation method and where the distance between the two sets of coordinates calculated using the cycle calculation method is greater than or equal to "20 mm" (the second threshold) and less than "21 mm", the output unit 23 outputs two sets of coordinates calculated using the same calculation method as the calculation method used to calculate the immediately previous output coordinates.

Comparative Example regarding Effects

Figure 10A:
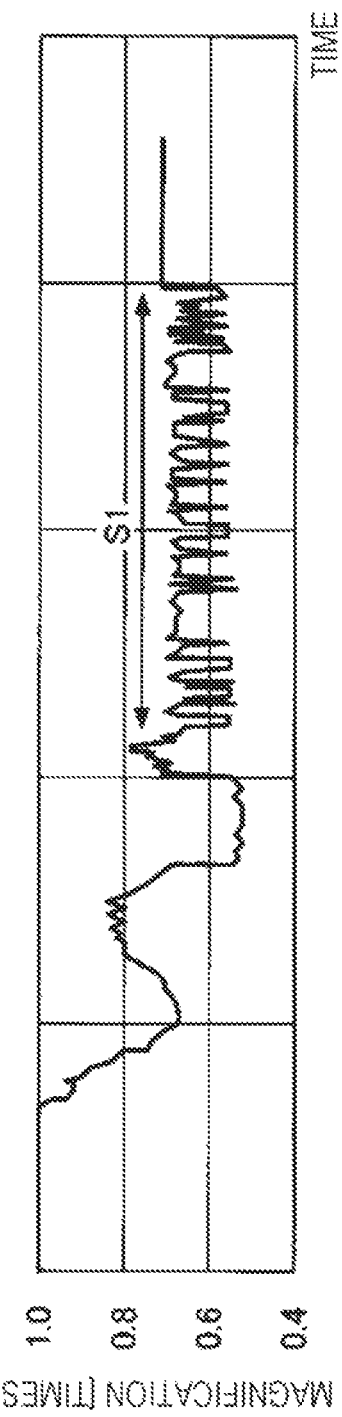
FIGS. 10A and 10B are diagrams illustrating a comparative example regarding effects of the coordinate input device according to the embodiment.
Figure 10B:
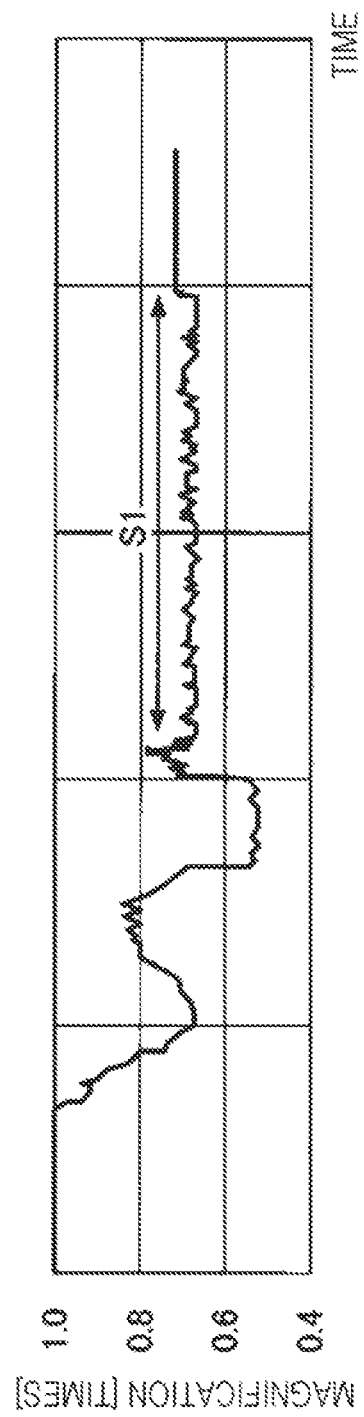

FIGS. 10A and 10B are diagrams illustrating a comparative example regarding effects of the coordinate input device 10 according to the embodiment. FIG. 10A illustrates an effect based on the flow chart illustrated in FIG. 6 and the output pattern illustrated in FIG. 7. FIG. 10B illustrates an effect based on the flow chart illustrated in FIG. 8 and the output pattern illustrated in FIG. 9.

FIGS. 10A and 10B illustrate examples in which a magnification operation is performed using the coordinate input device 10 according to the embodiment. In the magnification operation, the magnification of a target object is changed in accordance with the distance between two fingers 30 of the operator on the operation surface 10A. In FIGS. 10A and 10B, the vertical axis represents magnification in the magnification operation, and the horizontal axis represents time. Note that, in FIGS. 10A and 10B, a period S1 represents a period during which the distance between the two fingers 30 is fixed to a certain distance such that the two fingers 30 are in contact with each other (that is, a section in which, preferably, the magnification does not change).

The first threshold is made equal to the second threshold in the case illustrated in FIG. 10A, and the first threshold is made different from the second threshold in the case illustrated in FIG. 10B. As illustrated in FIG. 10B, when compared with the case illustrated in FIG. 10A, a change in magnification due to noise can be suppressed in the magnification operation when the distance between the two fingers 30 is fixed to the certain distance such that the two fingers 30 are in contact with each other.

As described above, the first threshold may be greater than the second threshold in the coordinate input device 10 according to the embodiment. In a case where the distance between the two fingers 30 is less than the first threshold ("21 mm" in one example) and greater than the second threshold ("20 mm" in one example), the output unit 23 may output coordinates calculated using the same calculation method as the calculation method used to calculate the immediately previous output coordinates.

As a result, in a case where the distance between the two fingers 30 is between the first threshold and the second threshold, the coordinate input device 10 according to the embodiment can reduce the frequency at which the method for calculating output coordinates is switched between the cycle calculation method and vertex calculation method.

The embodiments according to the present invention have been described above in detail; however, the present invention is not limited to these embodiments, and various modifications and changes can be made within the scope of the gist of the present invention described in Claims.

For example, in the vertex calculation method in one of the embodiments, the coordinate calculation unit 22 calculates coordinates of a peak position of the amount of change in capacitance as coordinates representing a proximity position of a finger 30 of the operator. However, the coordinates to be calculated are not limited to these. For example, in the vertex calculation method, the coordinate calculation unit 22 may treat a barycenter of a certain area where the amount of change in capacitance is greater than or equal to a predetermined threshold as coordinates of a peak position of the amount of change in capacitance, and calculate the barycenter as coordinates representing the proximity position of the finger 30.

What is claimed is:

1. A coordinate input device comprising:
a plurality of detection electrodes arranged in a grid shape;
a coordinate calculation unit that calculates coordinates representing a proximity position of an object on a basis of a change in a capacitance of each of the plurality of detection electrodes; and
an output unit that outputs the coordinates calculated by the coordinate calculation unit,
wherein
the coordinate calculation unit
calculates the coordinates using each of a first calculation method, in which the coordinates are calculated on a basis of a position of a detection electrode where a change in capacitance reaches a peak, and a second calculation method, in which the coordinates are calculated on a basis of periodicity of capacitance values on a circumference of a circle having a predetermined radius around a barycenter of a plurality of detection electrodes for which changes in capacitance are detected, and
in a case where two objects are detected using both the first calculation method and the second calculation method,
the output unit
outputs the coordinates calculated using the first calculation method in a case where a distance between the two objects is greater than a predetermined first threshold, and
outputs the coordinates calculated using the second calculation method in a case where the distance between the two objects is less than a predetermined second threshold.

2. The coordinate input device according to claim 1, wherein in the case where two objects are detected using both the first calculation method and the second calculation method,
the output unit
outputs the coordinates calculated using the first calculation method in a case where a distance between the two objects detected using the second calculation method is greater than the predetermined first threshold, and
outputs the coordinates calculated using the second calculation method in a case where the distance between the two objects detected using the second calculation method is less than the predetermined second threshold.

3. The coordinate input device according to claim 1, wherein
the coordinate calculation unit
calculates coordinates of each of the two objects using the first calculation method and using the second calculation method, and
in the second calculation method, periodicity of amounts of change in capacitance in the circle having the predetermined radius is calculated through Fourier series expansion, and the coordinates of each of the two objects are calculated on a basis of a distance from a barycenter of each of the two objects calculated using a coefficient of the periodicity and a direction from the barycenter of each of the two objects calculated using a phase of the periodicity.

4. The coordinate input device according to claim 1, wherein
the first threshold is greater than the second threshold, and
the output unit
outputs coordinates calculated using a same calculation method as a calculation method used to calculate immediately previous output coordinates in a case where the distance between the two objects is less than the first threshold and greater than the second threshold.

5. The coordinate input device according to claim 1, wherein the first threshold is equal to the second threshold.

6. The coordinate input device according to claim 1, wherein the output unit
outputs coordinates calculated using the first calculation method in a case where the two objects are not detected using the second calculation method.

7. The coordinate input device according to claim 1, wherein the coordinate calculation unit
calculates, as a coordinate representing the proximity position of the object, a vertex of a quadratic curve passing through an amount of change in capacitance at a peak electrode having a largest amount of change in capacitance, an amount of change in capacitance at a detection electrode that is immediately before the peak electrode, and an amount of change in capacitance at a detection electrode that is immediately after the peak electrode by using the first calculation method.

8. The coordinate input device according to claim 1, wherein the coordinate calculation unit
calculates the coordinates by treating a barycenter of an area where amounts of the changes in capacitance are greater than or equal to a predetermined threshold as a peak position of the amounts of the changes in capacitance.

9. A coordinate calculation method for a coordinate input device including a plurality of detection electrodes arranged in a grid shape,
the coordinate calculation method comprising:
a coordinate calculation step for calculating coordinates representing a proximity position of an object on a basis of a change in a capacitance of each of the plurality of detection electrodes; and
an output step for outputting the coordinates calculated in the coordinate calculation step,
wherein
in the coordinate calculation step,
the coordinates are calculated using each of a first calculation method, in which the coordinates are calculated on a basis of a position of a detection electrode where a change in capacitance reaches a peak, and a second calculation method, in which the coordinates are calculated on a basis of periodicity of capacitance values on a circumference of a circle having a predetermined radius around a barycenter of a plurality of detection electrodes for which changes in capacitance are detected, and
in the output step,
in a case where two objects are detected using both the first calculation method and the second calculation method,
the coordinates calculated using the first calculation method are output in a case where a distance between the two objects is greater than a predetermined first threshold, and
the coordinates calculated using the second calculation method are output in a case where the distance between the two objects is less than a predetermined second threshold.

* * * * *